United States Patent Office 3,095,380
Patented June 25, 1963

3,095,380
COMPOSITION FOR REMOVAL OF HEAT SCALE AND CARBON DEPOSITS
Benjamin Arden, Los Angeles, Calif., assignor, by mesne assignments, to Purex Corporation, Ltd., a corporation of California
No Drawing. Filed July 14, 1958, Ser. No. 748,183
4 Claims. (Cl. 252—152)

This application is a continuation-in-part of application Serial No. 511,096, now Patent No. 2,992,995, application Serial No. 511,098, now Patent No. 2,843,509, and application Serial No. 511,099, now Patent No. 2,992,997, all of said applications filed May 25, 1955.

This invention relates to removal of deposits on metallic parts, e.g., in the removal of deposits in the form of lead and other metal oxides and salts and carbon deposits. A particularly useful application of my invention is the removal of such deposits when found singly or in combinations of any two or all of such deposits. This invention is concerned with novel procedure and compositions for the removal of such deposits.

One important present application of my invention is to power plants of modern aircraft, particularly jet engines, such as turbojet and turboprop power plants, which are constructed from special heat resistant alloys and superalloys. During service, the various component parts are exposed to high operating temperatures in the vicinity of 1000–1500° F. or even higher. At these elevated temperatures the metal alloys are exposed to both reducing and oxidizing atmospheres at various times and, as a result, very tightly adherent scale deposits are formed on the hot parts of the engine.

Examples of components of jet engines which are covered with scale deposits are the combustion chamber inner liner, cross-ignition tubes, transition liner, turbine nozzle assembly, and turbine rotor assembly (with attached buckets), exhaust components, and, in some models, the after burner.

Formed on the surface of the engine parts is a tough carbon or graphite scale which tightly adheres to the metal surfaces. In describing these scales as carbon or graphite scales I do not exclude the presence in the carbon deposit of high molecular weight asphaltene or asphaltic or tarry binders which are formed in the burning of the fuel. These deposits are found both intermingled with and deposited on the heat scale and leaded deposits. In many cases massive carbon deposits are formed because of severe conditions of engine operation, especially in the case of "hot" spots. The heat scale formed on components of jet engines and other types of engines operating at high temperature under oxidizing conditions is a scale of oxide character known as "heat scale," which is deposited because of high temperature oxidizing conditions. Thus, at high temperatures of operation, e.g., existing in operation of jet engines, a heat scale is formed which is largely a mixture of the oxides of the metals or of the metal alloys of which the engine parts are constructed. The relative proportions of the various oxides of which such heat scale is composed may approach but need not correspond exactly with the percentages of the parent metals in the alloy.

The chief alloys used for jet engine components and on which the above-noted scales or deposits are formed include stainless steels, e.g., of the chromium or chromium-nickel type, and heat resistant alloys and super-alloys including nickel base and cobalt base alloys, iron-chromium-nickel alloys, and cobalt-nickel-chromium alloys. The aforementioned deposits may also be formed on other types of alloys. They are thus to be distinguished from ordinary rust produced by corrosion of mild steel and iron in their physical and chemical nature and are much more refractory and difficult to remove by alkaline reagents.

Other objects and advantages will be apparent from the description of my invention which follows:

I have found that deposits, including carbon and heat scale, can be removed from engine parts, such as jet engine "hot section" components, by treatment of such parts in an alkaline solution at elevated temperature and containing a polyalkanolpolyamine. The action of the mixture of such amine and alkali is improved by the addition of a salt of an acid forming a complex with heavy metal ions, the solution being highly alkaline and having a pH not less than about 13. The metals and alloys previously referred to are stable and not corroded in any substantial degree in solutions of such alkalinity.

The complex former employed can be an aliphatic hydroxy acid or a low molecular weight fatty acid, and strong alkalies such as alkali metal hydroxides are utilized to produce the desired high alkalinity. Temperature of treatment in the solution is generally in excess of about 200° F. While the aforementioned composition is sufficient in itself particularly for successful removal of leaded deposits on engine parts, such reagents have but limited value in removal of carbon deposits and of heat scale. I have also found that the addition of phenol compounds and/or polyalkanolpolyamines, to the treating bath, as described more fully hereinafter, improves the action of the bath on the parts especially as regards carbon and heat scale removal.

Treatment of engine parts contaminated with scale, as described above, in the invention solutions or compositions preferably also containing an alkanolamine for relatively brief periods, affords (1) complete removal of adherent leaded deposits, (2) removal of carbon deposits, and (3) removal of heat scale and conditioning of any residual amounts of the heat scale so as to render the latter susceptible to easy removal by simple chemical follow-up cleaning, whenever necessary.

The aqueous alkali solution of the invention contains, as its alkalinity producing agent, an alkali metal compound which in solution gives free alkali metal hydroxide which may be potassium or sodium hydroxide. Potassium hydroxide is preferred although sodium hydroxide is also suitable. A substantial amount of alkali of this type is employed in order to attain the high pH values necessary for proper functioning of the solution. The pH of the descaling solution hereof is maintained substantially above 12, and is generally not less than about 13. Solutions of alkali which are preferred have values of the pH of the solution above about 13, and may be 14 or even higher. Actually, at such high pH values, it is more common practice to describe the alkalinity in terms of percent sodium hydroxide or potassium hydroxide or some other equivalent alkali metal hydroxide. The amount of alkaline material employed may range to give in solution free alkali metal hydroxide equivalent to from about 4% to about 40% by weight alkali metal oxide, e.g., ($K_2O$, $Na_2O$) based on the weight of the solution. Preferably, from about 10–25% of alkali, most desirably potassium hydroxide, is used to obtain the desired high alkalinity.

A polyalkanolpolyamine is included in such solution. I preferably also employ compounds in the form of certain salts, to act in conjunction with the alkali for converting the oxide deposits to highly soluble complexes. Such agents are herein referred to as complexing agents. These salts are derived from an aliphatic hydroxy acid such as lactic, citric, tartaric, gluconic, glyceric, malic, glycollic acid, and saccharic acid. These salts or mixtures of these salts may be employed for the above purpose. Low molecular weight fatty acids such as acetic or propionic acid form soluble compounds of lead. These salts, while having activity in converting the heavy metal present in compounds of the scale or rust into a soluble form, are not as useful for this purpose in the solutions of my invention as are the salts of the hydroxy acids referred to above. They may be used effectively particularly if used together with the hydroxy acids. The soluble salts of the above acids are employed, preferably employing the potassium or sodium salt, for example, potassium or sodium acetate or potassium or sodium glycollate. The quantity of these complexing salts added to the solution may vary, but generally from about 1 to about 45% by weight of such salts can be present in the treating solution in water, amounts of about 4 to about 40% usually being employed. These salts can be used separately or in admixture with each other.

Reagents of the above composition are particularly useful in removal of leaded deposits, but will not completely remove the heavy heat scale or the heavy carbon deposits frequently found with such leaded deposits.

Over a period of itme, with reuse of the solution on parts to be cleaned, at the high temperatures of operation noted above, water evaporates from the solution of the alkali and complexing agent referred to above and care must be taken to be sure that the concentration of the alkali and salts does not become so excessive as to cause precipitation on the parts to be cleaned. Evaporation is reduced to a practical controllable minimum to permit reuse of the solution by the use of from about 30 to 65% by weight of water in the solution, generally about 35 to 50% by weight of water, in conjunction with a high boiling compatible (or water soluble) organic solvent having a low vapor pressure at the temperatures up to about 300° F. Such solvents can be polyols or alkanolamines. Examples of suitable polyols, particularly diols and triols, along with their boiling points and vapor pressures (at 20° C.) of the chemically pure compound are as follows:

TABLE I

| Name | Boiling pt. at 760 mm. pressure | | Vapor pressure, mm. Hg at 20° C. |
| --- | --- | --- | --- |
| | ° C. | ° F. | |
| Ethylene glycol | 198 | 388 | 0.05. |
| Diethylene glycol | 255 | 442 | less than 0.01. |
| Triethylene glycol | 291 | 524 | Do. |
| Dipropylene glycol | 232 | 417 | Do. |
| Glycerol | 290 | 522 | Do. |
| Sorbitol, M.P., 97° C | | | vapor pressure in 70% aqueous solution less than 0.01. |

The compatible polyols and polyalkanolpolyamines which I prefer to use for purposes of the invention are the polyols and polyalkanolpolyamines or mixtures thereof or technical grades thereof having boiling points, in pure state, of about 400° F. and higher and having preferably a vapor pressure at 20° C. of less than 0.01 mm. of mercury. By compatible polyols and polyalkanolpolyamines I mean those which form stable dispersions or solutions in the water system of the composition of my invention at the operating temperatures of 200 to 300° F. and are not decomposed by pyrolysis at such temperatures under the conditions of proposed use. Examples of the polyalkanolpolyamines with their boiling points and vapor pressures (at 20° C.) of the pure compounds are set out below.

Examples of suitable polyalkanolpolyamines for purposes of the invention are as follows:

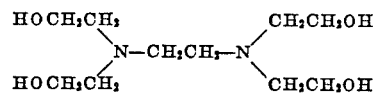

Tetra-kis N-(2-hydroxyethyl) ethylenediamine and

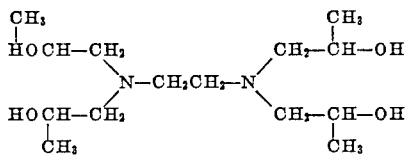

Tetra-kis N-(2-hydroxypropyl) ethylenediamine

Additional examples are N,N'-dihydroxyethyl ethylene diamine, tetraethanol propylene diamine, pentaethanol diethylenetriamine and hexaethanol triethylenetetramine. Substituted polyaklanolpolyamines may be used. For example, we may employ the propylene diamine derivatives of the foregoing in which the central —CH$_2$—CH$_2$— group linked to the two amino nitrogens is replaced by a —CH$_2$—CH$_2$—CH$_2$— group, respectively. Likewise, in any of the foregoing any one or all of the ethanol groups may be replaced by a homologue or a substituted homologue of the ethanol group, e.g., a propanol group. Examples of the latter are monohydroxy ethyl trihydroxy propyl ethylene diamine; dihydroxy ethyl dihydroxy propyl ethylene diamine and trihydroxy ethyl monohydroxy propyl ethylene diamine. Preferably, however, they should not be so extensively substituted as to disadvantageously impair their solubility and stability in the alkaline solution or to disadvantageously alter their characteristic as a polyalkanolpolyamine. I may employ polyalkanoldiamines in which the alkanol radical is either propanol or ethanol, in particular N,N,N',N' tetra-kis (2-hydroxypropyl) ethylenediamine and the 2-hydroxyethyl analog. In place of a single polyalkanolpolyamine, I may use mixtures of two or more of any of the foregoing polyalkanolamines and where I refer to "polyalkanolpolyamine," I also include such mixtures within the term polyalkanolpolyamine.

The amount of polyalkanolpolyamine employed can vary. The amount generally used may be in the range of about 0.2 to about 30% by weight of the solution. The quantity of this material which can be utilized will, of course, be limited by the solubility of the polyalkanolpolyamine employed. Using these solvents may be employed in admixture. For example, a polyalkanolamine can be employed together with a polyol in the same alkali treating solution according to the invention.

The amount of high boiling solvent which can be employed in addition to the polyalkanolpolyamine will depend upon the solubility of the amine and on the nature of the compatible solvent. When using compatible solvent added to the solution containing the ingredients or to the anhydrous mixtures thereof, in the ranges specified herein, the amount of compatible solvent may be from zero to an amount such that the total of the ingredients of the solution in the anhydrous mixture is 100 percent or a value of 100 parts by weight. However, the quantity of solvent used can be carried as desired, in conjunction with concentration of alkali and organic salt present, to obtain a solution having the desired characteristics. The preferred organic solvent is one with boiling point ranging above about 400° F. and having other properties such as efficacy in removal of carbon and heat scale described herein.

Phenols in the form of alkali metal phenates such as the potassium and sodium phenates, when added to the solutions of the invention, aid substantially in promoting carbon removal. Thus, I may employ the phenols, i.e., the monatomic phenols such as hydroxybenzene and its homologues including cresol and cresylic acid, polyatomic phenols such as the dihydroxybenzenes and its homologues, triatomic phenols such as pyrogallol and its homologues, and higher polyphenols, which are sufficiently acid to form salts with alkali at the concentrations employed which are soluble in the aqueous compositions of my invention at the temperature of the treatment, to wit, at 200–300° F. The alkali metal salts I have found effective in this respect are the salts of phenol itself, the ortho, meta and para dihydroxy benzenes, and of the trihydroxy benzenes such as pyrogallic acid. These materials are generally compatible with my alkali solutions. Hence, such materials can be employed as additive to the treating reagent. It may be used in place of the polyols to give some improvement effective in further aiding carbon removal and assist in raising the boiling point, i.e., suppress the vapor pressure of the solution. Such phenates may be employed in amounts ranging up to about 20% by weight of the solution, generally about 3 to 15%. However, the addition of the polyols or alkanolamines to such solutions gives a large improvement in the removal of the carbon deposits and of the leaded deposits and of heat scale.

The polyalkanolpolyamines in addition to their effect on the boiling point of the solutions have in themselves an influence on the chemical reactivity of the solution in removal of heat scale and carbon deposits. The effectiveness of the polyalkanolpolyamines on the removal of heat scale is greatly enhanced by maintaining suitably high concentrations of the polyalkanolpolyamines and of alkali in the treating solution in addition to suitable concentrations of the salts of the hydroxy acid or low molecular weight fatty acid, and preferably also employing salts of the hydroxy acids when using the low molecular weight fatty acid salts as the complexing agent.

The compositions of my invention containing polyalkanolpolyamines or its equivalent alcoholates contain from about 10 to about 25% of alkali metal hydroxide, about 4 to about 40% of complexing agent, from 0 to about 15% of phenates and when employing alkanolamines from about .2 to about 30% of polyalkanolpolyamines. If the solution contains less than 30% of polyalkanolpolyamines, I may employ in addition polyols having boiling points of the nature described above, and sufficient water to make 100% by weight, the amount of water ranging from about 25 to about 80%. As a further improvement, I may adjust the above ratios of the components of the composition so that there is little and preferably an inconsequential amount of water evaporated at the treating temperature. The above mixtures have a boiling point which is in the range up to 220° F. where only the alkali and complexing agent and no organic solvent is used and from about 220 to 300° F. where the alkanolamine or polyol is used and water in amount ranging from about 30 to about 60% of the solution is used, all percentages being by weight of the solution. The boiling point is preferably higher than the average temperature of the cleaning solution as employed in the process.

While I do not desire to be bound by any theory of the reaction, I do not exclude the possibility that more or less of the polyalkanolpolyamines in the alkaline aqueous solutions are converted to the equivalent alcoholate.

*Example I*

The following is an illustrative example of a formulation according to my invention. This is given in order to illustrate my invention and not as a limitation thereof.

| Ingredient | Percent by weight range |
| --- | --- |
| Potassium glycollate or other complex former | 10–25 |
| Potassium acetate | 2–10 |
| Potassium hydroxide or sodium hydroxide | 15–25 |
| Polyalkanolpolyamine | 1–20 |
| Water, Balance to | 100 |
| As a specific example: | |
| Potassium hydroxide | 18.0 |
| Potassium acetate | 10.0 |
| Potassium glycollate | 20.0 |
| N,N'-(Dihydroxyethyl) ethylene diamine | 12.0 |
| Water, balance to | 100 |

In employing the above ingredients to form the alkaline solution, I may adjust the quantities so that the alkali employed may be divided between free alkali and alkali bound as alcoholate of the polyalkanolamine and dissolve the mixture in water.

The alkali metal salt of the lower weight fatty acid is used as an extender to diminish the cost of the complexing agent. The salts of the hydroxy acids, particularly the tartrates, citrates, glycollates, and lactates, are much more effective than the salts of the lower molecular weight fatty acid and these may be omitted by increasing the proportion of the salts of the hydroxy fatty acids, for example, in equal amount by weight.

In practice, the treating and removing composition of the invention is heated in a suitable container or tank, e.g., constructed of stainless steel or Monel metal, to the operating temperature, and the engine parts encrusted with carbon, and heat scale deposits are immersed therein. Temperature of the solution during treatment is maintained in the range of 200–300° F. usually 235 to 280° F. The preferred temperature range is about 255 to 280° F. The solution has a boiling point higher than the treating temperature and is in excess of about 220–300° F. and usually about 300° F. Where the tank is heated by steam coils, the temperature adjacent the coils may be above the boiling temperature; however, the average temperature of the solution is as stated. The time of treatment in the above alkaline solution is generally from about 15 minutes to about 2 hours, depending on the amount and tenacity, particularly as regards carbon, of the scale to be removed. Usually from 30 to 45 minutes at about 270° F. is sufficient for this purpose. The parts are then withdrawn from the solution and spray rinsed with either cold or warm water.

The alkali solutions described above for removing the deposits produce no measurable corrosion of the metal of which the engine part is constructed, during the cleaning operation. Hence, no weakening or dimensional change in the metal part is effected by the invention process.

I may employ in my process, in place of the alkanolamines referred to above, their equivalent in the form of the alcoholate as, for example, the sodium or potassium salt of the corresponding alcoholate.

Thus, although I do not wish to be bound by any theory of the chemistry of the process, it is my view the polyalkanolpolyamine in alkaline solution, and this includes the alkali alcoholate equivalent, as well as having the physical effect of raising the boiling point of the solution, reacts chemically to assist the alkali and the complexing salts in forming complexes of the metal atoms of the heat scale.

In many cases, the above treatment is sufficient to remove the carbon and heat scale. Where, however, the heat scale is not removed, the previous treatment will condition the heat scale so that it is readily removed by washing the treated part and by a following treatment employing alkaline permanganate solution.

Compositions for alkaline permanganate solution:

I

Sodium hydroxide _____ percent __ 10 (16–20 oz. 1 gal.)
Sodium carbonate _____ do ____ 10 (16–20 oz. 1 gal.)
Potassium permanganate _____ do ____ 6 (7–10 oz. 1 gal.)
Water _____ do _____ 74

| | II Percent |
| --- | --- |
| Sodium hydroxide | 20.0 |
| Sodium carbonate | 5.0 |
| Potassium permanganate | 5.0 |
| Water | 70 |

III

| | |
| --- | --- |
| Sodium hydroxide | 20.0 |
| Potassium permanganate | 5.0 |
| Water | 75.0 |

The range employed is as follows:

Sodium hydroxide—about 10 to about 20%
Potassium permanganate—3 to 12% to which may be added sodium carbonates in range of about 5 to 10% if it is desired, although it is not essential. Instead of sodium hydroxide and potassium permanganate, their potassium or sodium analogues may be used in chemically equivalent proportions.

I may employ any of the permanganate solutions heretofore employed or specified for such cleaning service in prior art processes and thus produce parts completely cleaned of heat scale in a relatively short time, where such permanganate solutions employed in the prior art process are in themselves ineffective in such periods of time and require prolonged treating times and mechanical abrading methods, and which frequently fail to produce cleaning when the present invention is successful in relatively short periods of time. I may and preferably do employ the alkaline permanganate bath disclosed in my copending application Serial No. 741,475, filed June 9, 1958 (now Patent No. 3,000,829) of which application, this application is a continuation in part. For example, the bath may be composed of the following:

| | Percent by wt. |
|---|---|
| Sodium hydroxide | 11.7 |
| Sodium carbonate | 11.7 |
| Potassium permanganate | 8.5 |
| Potassium fluoride | 4.0 |

Water, balance to make 100%.

The parts are immersed in the alkaline permanganate bath, maintained, e.g., at 190–210° F. for say ½ to 1½ hours. The parts are then removed, rinsed by dip or spray with water, and then brightened to remove manganese dioxide stains and smut by immersion for about 5 to 15 minutes in a 20 to 25% solution of nitric acid at ambient temperature, or a repeated treatment in the treating solutions of my invention, containing the polyalkanolamines.

It is noted that the alkaline permanganate bath is not effective per se for rapid removal of leaded deposits, heat scale or carbon deposits. I have found that it is generally useful only after the deposits of carbon deposits, and heat scale have been substantially removed or conditioned by treatment in the alkali solutions containing the polyalkanolpolyamines of the invention described above.

I have found that by addition of a polyalkanolpolyamine to the above alkali solutions containing the complexing agents, tenacious carbon deposits often formed on hot parts of engines, particularly jet engines, may be rapidly and completely removed. When using the polyalkanolpolyamines, substantially all of the heat scale is in many cases also completely and efficiently removed in a relatively short time of treatment in such solutions. When the heat scale is tightly adherent refractory and particularly if glazed over so that it is not completely removed during the above treatment, the treatment conditions the scale so that it is completely and cleanly removed by a final treatment with alkaline permanganate solution. Sometimes to remove any smut left by the permanganate solution a treatment with acid such as nitric acid or a second treatment with the polyalkanolamine solution of my invention completes the cleaning treatment to remove all of the residual heat scale.

I may, however, treat the part in stages. Thus, I may first treat the part with an alkali solution containing the complexing agent and no polyol or polyalkanolpolyamine at relatively moderate temperatures, for example, 180–220° F., and remove a major amount of the leaded deposits and such light heat scale and carbon which is relatively loosely attached. I may then follow the treatment with a second treatment with the compositions of my invention containing the aforesaid organic reagents in the manner described above to produce a complete removal of the obdurate highly resistant leaded deposits and carbon, and part of the heat scale; or I may employ as an initial treatment the compositions of my invention containing the polyols and/or polyalkanolpolyamines in the manner described above and follow this treatment with the compositions of my invention employing the polyalkanolpolyamines, employing them in the manner described herein. The final treatment with permanganate and if necessary followed by treatment with nitric acid or retreatment with the polyalkanolpolyamine solutions will produce a clean and bright part. By this procedure, I may reduce the time of treatment with each reagent, and also I economize in the use of the more expensive organic reagents.

In formulating the compositions of my invention and in the performance of the processes of my invention, I may, but need not, employ the chemical compounds described or referred to in the specification in their chemically pure state. Commercially available compounds may be employed. These frequently contain admixed therewith some proportion of other compounds which are not separated therefrom in the process of manufacture. These compounds are frequently referred to as technical grade to distinguish them from the chemically pure compounds. Provided these impurities present in the technical grades do not alter the physical and chemical properties of the compound in question, such technical grades may be used. For example, technical grade polyols and technical grade polyalkanolpolyamines may be employed to adjust the boiling point of the solution provided the technical grade has suitable boiling point and vapor pressure limits and compatibility described above, and in the case of the polyalkanolpolyamines do not interfere with the chemical reactivity and solvent properties described above. Technical grade polyalkanolpolyamines may contain some other amines and alkanolmonoamines as impurities. All these are included as alternatives to the pure compound.

In all of the preceding examples and uses there may be added to the treating solution suitable wetting agents which are stable in the alkaline solution such as anionic wetting agents, such as soaps, sodium salts of the fatty acids or of the sulfonated fatty acids, salts of the petroleum sulfonates and of the alkyl aryl sulfonates, or any other alkali stable wetting agent of which the art has many examples, as will be understood by those skilled in this art.

The process and compositions of this invention are also applicable to the removal of heat scale in the absence of carbon deposits. Thus, heat scale generated on stainless steel or other alkali resistant metals during heat treating of the metal at high temperatures may be removed in the same manner as described above.

The compositions of my invention may be packaged in an anhydrous condition and dissolved in water to make the treating baths and in said case this invention includes mixtures not in water solution, as well as the novel water solutions thereof. The weight percentage of the various components in the anhydrous mixtures are readily ascertainable from the data previously given by simple arithmetical calculation.

The solutions described above may be repeatedly used in the procedures described. After cleaning of the metallic parts the solutions may be repeatedly used on other metallic pieces to be cleaned according to this invention. The partially spent solutions may be fortified by adding additional ingredients to maintain their concentration within the ranges specified, and the fortified solution employed in the above procedures. While the solutions have been described above according to their content when freshly compounded for use according to this invention, this description does not exclude the possibility that transformations during use may occur. Thus, for example, oxidation of the alkanolamines to the corresponding carboxylates may occur in part, and thus the ingredients of the solution be changed in some respects during use without substantially impairing the utility of the solutions for the uses described. Such used solutions are within the scope of the invention disclosed and claimed herein.

While I have described a particular embodiment of my invention for purposes of illustration, it should be understood that various modifications and adaptations thereof may be made within the spirit of the invention as set forth in the appended claims.

I claim:

1. A composition of matter which when present in a water solution in amounts sufficient to give a free alkali content of about 4% by weight of the solution is suitable for the removal of heat scale and carbon deposits, said composition of matter consisting essentially of an alkali metal hydroxide and a polyalkanolpolyamine having a boiling point in excess of 400° F., said polyalkanolpolyamine being present in the composition in amounts sufficient to give in said solution from about .2 to about 30% of polyalkanolpolyamine by weight of said solution, said polyalkanolpolyamine being dispersible and stable in aqueous alkaline solution at 200°–300° F.

2. The composition of claim 1, in which the polyalkanolpolyamine is a tetraalkanoldiamine.

3. The composition of claim 1, in which the polyalkanolpolyamine is a dialkanoldiamine.

4. A composition of matter, which when present in a water solution in amounts sufficient to give a free alkali content of about 4% by weight of the solution is suitable for the removal of heat scale and carbon deposits, said composition of matter consisting essentially of 4 to 40 parts by weight alkali metal hydroxide, and .2 to 30 parts by weight polyalkanolpolyamine having a boiling point in excess of 400° F., said polyalkanolpolyamine being dispersible and stable in aqueous alkaline solution at 200°–300° F.

References Cited in the file of this patent

UNITED STATES PATENTS

| | | |
|---|---|---|
| 2,240,957 | Munz | May 6, 1941 |
| 2,408,096 | Pierce | Sept. 24, 1946 |
| 2,524,218 | Bersworth | Oct. 3, 1950 |
| 2,584,017 | Dvorkovitz et al. | Jan. 29, 1952 |
| 2,650,875 | Dvorkovitz et al. | Sept. 1, 1953 |
| 2,653,860 | Meyer | Sept. 29, 1953 |
| 2,653,861 | Meyer | Sept. 29, 1953 |
| 2,697,118 | Lundsted | Dec. 14, 1954 |
| 2,755,304 | Bersworth et al. | July 17, 1956 |
| 2,759,021 | Gaar et al. | Aug. 10, 1956 |
| 2,767,214 | Bersworth | Oct. 16, 1956 |
| 2,777,818 | Gambil | Jan. 15, 1957 |
| 2,806,060 | Bersworth et al. | Sept. 10, 1957 |
| 2,808,435 | Young | Oct. 1, 1957 |
| 2,843,509 | Arden | July 15, 1958 |
| 2,992,997 | Arden et al. | July 18, 1961 |

OTHER REFERENCES

Versenes Tech. Bull. No. 2, Sec. I, pp. 17, 19, 21 and 23; Sec. II, pp. 37–39; pub. by Bersworth Chemical Co., Framingham, Mass.